(12) United States Patent
Doornenbal

(10) Patent No.: US 8,853,983 B2
(45) Date of Patent: Oct. 7, 2014

(54) ROTARY POSITION ENCODING METHOD AND UNIT

(75) Inventor: Jan Doornenbal, Harmelen (NL)

(73) Assignee: Aktiebolaget SKF, Gothenburg (SE)

( * ) Notice: Subject to any disclaimer, the term of this patent is extended or adjusted under 35 U.S.C. 154(b) by 119 days.

(21) Appl. No.: 13/319,256

(22) PCT Filed: Apr. 29, 2010

(86) PCT No.: PCT/EP2010/002635
§ 371 (c)(1),
(2), (4) Date: Jan. 25, 2012

(87) PCT Pub. No.: WO2010/127807
PCT Pub. Date: Nov. 11, 2010

(65) Prior Publication Data
US 2012/0112676 A1    May 10, 2012

(30) Foreign Application Priority Data

May 6, 2009    (WO) ................. PCT/EP2009/003228

(51) Int. Cl.
*H02K 29/08* (2006.01)
*G01D 5/245* (2006.01)
*G01D 5/249* (2006.01)

(52) U.S. Cl.
CPC ............ *G01D 5/2492* (2013.01); *G01D 5/2452* (2013.01)
USPC ................. 318/400.39; 318/602; 318/400.04; 318/721; 324/207.25; 324/207.22; 702/155

(58) Field of Classification Search
USPC ......... 318/400.39, 254, 685, 602, 400.4, 721, 318/823, 286, 369, 489, 652, 400.16, 696, 318/701, 400.01, 603, 715, 432, 727, 799; 324/207.25, 207.22, 249, 260, 207.2, 324/207.24, 207.15–207.19, 173, 253, 254; 340/870.33
See application file for complete search history.

(56) References Cited

U.S. PATENT DOCUMENTS

| | | | | |
|---|---|---|---|---|
| 4,884,016 A | * | 11/1989 | Aiello | ........................... 318/685 |
| 6,118,271 A | * | 9/2000 | Ely et al. | .................. 324/207.17 |
| 7,923,993 B2 | * | 4/2011 | Takahashi et al. | ....... 324/207.25 |
| 8,319,493 B2 | * | 11/2012 | Takahashi et al. | ....... 324/207.25 |
| 2003/0128026 A1 | * | 7/2003 | Lutz | ........................... 324/207.2 |
| 2005/0127906 A1 | * | 6/2005 | Miyashita et al. | ....... 324/207.25 |
| 2007/0176568 A1 | * | 8/2007 | Robichaux et al. | ........... 318/254 |
| 2009/0140731 A1 | * | 6/2009 | Miyashita et al. | ....... 324/207.25 |
| 2010/0225309 A1 | * | 9/2010 | Takahashi et al. | ....... 324/207.25 |
| 2011/0025312 A1 | * | 2/2011 | Nagano et al. | ........... 324/207.25 |

FOREIGN PATENT DOCUMENTS

| | | |
|---|---|---|
| DE | 10127670 A1 | 9/2002 |
| FR | 2930637 A1 | 10/2009 |
| JP | 2009080058 A | 4/2009 |

\* cited by examiner

*Primary Examiner* — Shawki S Ismail
*Assistant Examiner* — Jorge L Carrasquillo
(74) *Attorney, Agent, or Firm* — Bryan Peckjian; SKF USA Inc. Patent Department

(57) ABSTRACT

A unit of absolute rotary position encoding, where the angular range of encoding is matched to the number of poles of an electrical motor it is intended that the encoder is to be attached to. The electrical motor is suitably a brushless DC motor. This provides unique rotational position values only through an angle corresponding to an angle between two consecutive poles to enable control/drive electronics to accurately and smoothly turn the rotor from standstill and at low speeds with varying loads applied to the motor.

4 Claims, 3 Drawing Sheets

ROTARY POSITION ENCODING METHOD AND UNIT

CROSS-REFERENCE

This application is the US national stage of International Application No. PCT/EP2010/002635 filed on Apr. 29, 2010 which claims priority to International Application PCT/EP2009/003228 filed May 6, 2009.

TECHNICAL FIELD

The invention concerns rotary position encoders and is more particularly directed to rotary position encoders for electrical motors, such as brushless DC motors.

BACKGROUND

A brushed DC motor conventionally comprises a rotor and a stator. The stator comprises a plurality of magnets, such as permanent magnets. The rotor comprises armature coil windings. In a brushed DC motor, brushes make a mechanical contact with a commutator to make an electrical connection between the armature coil windings of the rotor and a DC electrical source. As the rotor rotates, the stationary brushes come into contact with different sections of the rotating commutator. The different sections of the commutator are coupled to the armature coil in such a way that a current is switched to always flow through the armature coil closest to the stationary stator magnets.

In a brushless DC motor the magnets and the armature windings have switched places. Thus the rotor comprises a plurality of magnets, preferably permanent magnets, and the stator comprises the armature coils. This eliminates the problem of how to transfer current to a rotating armature. Brushless DC motors most commonly use an electronic controller instead of the brush commutator system. Brushless DC motors offer several advantages over brushed DC motors, including higher efficiency, higher reliability, reduced noise, and longer service life mainly due to elimination of brush erosion. Additionally ionizing sparks from the commutator are eliminated and there is an overall reduction of electromagnetic interference.

Since the windings are part of the stator instead of the rotor, they are not subjected to centrifugal forces. Additionally since the windings are located around the perimeter, they can be cooled by conduction to the motor casing requiring no airflow inside the casing for cooling. This in turn means that the motor can be entirely enclosed and protected from dirt or other foreign matter.

The downside of brushless DC motors is that they require somewhat complicated electronic controllers. The controller additionally requires some means of determining the rotor's orientation/position. Some designs use hall effect sensors or a rotary encoder, which might comprise hall effect sensors. The higher the power rating of the motor, the higher the accuracy of the rotor's orientation/position that is necessary to reduce losses and attain accurate control of the motor. Knowing the position/orientation of the rotor is important to attain optimal efficiency and be able to properly control torque, especially for low speeds and from standstill. There is still room for improvement on how to accurately determine the rotor orientation/position, especially of a brushless DC motor.

SUMMARY

An object of the invention is to define a method and a unit of determining a rotary position between a rotor and a stator of an electrical motor, especially of a brushless DC motor.

This is achieved according to the invention by the understanding that to control a brushless DC motor, only the rotational position between two consecutive poles needs to be known, not the absolute rotary position over a full turn between rotor and stator of the electrical motor. According to the invention an absolute position encoder is divided into as many parts as poles of an attached electrical motor.

The aforementioned object is further achieved according to the invention by a fractional absolute rotary position encoder. The encoder is arranged to be directly or indirectly coupled to a rotor of an N-pole electrical motor, suitably a brushless DC motor, where N is equal or greater than four, for example a 22 pole brushless DC motor. According to the invention the encoder comprises a sensing device and a processing device. The sensing device is arranged to at least partly be mounted directly or indirectly to the rotor and to provide a measure corresponding to a rotation of the rotor. The processing device is arranged to provide an absolute rotary position value from the measure from the sensor device. The absolute rotary position value repeats N times for a full turn of the rotor, thus providing an absolute rotary position encoding between two consecutive poles of the N-pole electrical motor. The encoder provides information about the relative rotary position of the rotor and the stator of the N-pole electrical motor, only so far as the relative rotational position of the rotor/stator between two consecutive poles, not which poles.

An enhancement to the fractional absolute rotary position encoder is that the sensing device comprises N equal sections arranged to be mounted directly or indirectly to the rotor.

A further embodiment of the fractional absolute rotary position encoder is where the sensing device comprises two multi-pole magnetic rings. Each of the multi-pole magnetic rings being divided into N sections. One of the multi-pole magnetic rings comprises n magnetic pole-pairs for each of the N sections. The other of the multi-pole magnetic rings comprises n+1 magnetic pole-pairs for each of the N sections, where n is an integer.

The different additional enhancements of the fractional absolute rotary position encoder according to the invention can be combined in any desired manner as long as no conflicting features are combined The aforementioned object is also achieved by a control arrangement of a brushless DC motor. According to the invention the arrangement comprises one of the fractional absolute position encoders described above.

The aforementioned object is also achieved according to the invention by a method of providing a motor control unit of an N-pole motor where N is at least four, with a rotary position of an axle coupled to the motor. According to the invention the method comprises a plurality of steps. In a first step the number of poles, N, of the motor is determined. In a second step a full turn of the axle is divided by the number of poles, N, creating N fractions of the full turn of the axle. A third step comprises arranging a fractional absolute rotary position encoding unit having N times full scale absolute rotary position encoding through one full turn. Thus each full scale absolute rotary position encoding, unique output values, is equal to one fraction of the full turn of the axle. Finally in a fourth step the motor control unit is provided with values from the absolute rotary position encoding unit.

By providing a method and a unit for determining the relative rotary position between rotor and stator only to the extent of repeatedly providing unique values through an angle corresponding to the angular distance between two consecutive poles, it is possible to produce an accurate encoder. The encoder can be made to provide very accurate values since it only has to do so over a limited angle, the angle being 90 degrees or less and not a full turn. This advantageous when using an encoder with a pole-pair magnet ring, and especially advantageous when an encoder is built up of two or more multi-pole magnet rings where each magnet ring comprises a different number of pole-pairs.

Traditionally a full turn absolute rotational position encoder comprises an inner multi-pole magnetic ring that in turn comprises n pole-pairs and comprises an outer multi-pole magnetic ring that in turn comprises n+1 pole-pairs, giving a unique difference of the electrical angles of both rings over one full turn. To increase the accuracy of such an encoder, according to the invention, the multi-pole magnet rings are divided into N equal sized sections, where N is the number of poles of the electrical motor to which the encoder is intended to be used with. For each of the N sections, one of the multi-pole magnet rings comprises n pole-pairs and the other multi-pole magnetic ring comprises n+1 pole-pairs. In total one of the multi-pole magnetic rings comprises N times n pole-pairs, and the other multi-pole magnetic ring comprises N times (n+1) pole-pairs. This gives an encoder that can give very accurate absolute rotational position values of the relative rotational position of the stator and the rotor over an angle that corresponds to an angle between two consecutive poles of the electrical motor, but only over such an angle. Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

The invention relates to position encoders and especially position encoders used to determine the relative rotational position between a rotor and a stator of an electric motor, especially a brushless DC motor. As mentioned, the relative rotational position between the rotor and stator is used by the control electronics to correctly drive the motor. It is especially important to accurately know the relative rotational position between the stator and rotor to be able to control the motor efficiently from standstill and at low speeds. It turns out that it is not important for the control electronics to know a relative rotational position between the stator and the rotor over a full turn, but only the relative rotational position of the rotor and stator between two poles. The invention is thus the concept of an absolute positional encoder divided into as many parts as poles of an attached electrical motor. In other words, the invention is a rotational position encoder that is an absolute rotational position encoder only for the rotational angle of $2\pi$ radians divided by the number of poles (or 360 degrees divided by the number of poles) of an electrical motor to which it is to be attached. The invention is based on not having a requirement of knowing an absolute rotational position for a full turn. By having a rotational position encoder that provides absolute rotational position values that repeat a multiple of times during a full turn, it is possible to manufacture a more accurate encoder than if it would have to provide unique absolute rotational position values for a full turn. This comparison is based on the full turn absolute encoder and the encoder according to the invention being based on the same technology. Such encoders can for example be ones using one or more multi-pole magnetic rings/discs and hall effect sensors, where each multi-pole magnetic disc has a different number of magnetic pole-pairs.

In order to clarify the method and device according to the invention, some examples of its use will now be described in connection with FIGS. 1 to 4.

Figure 1:
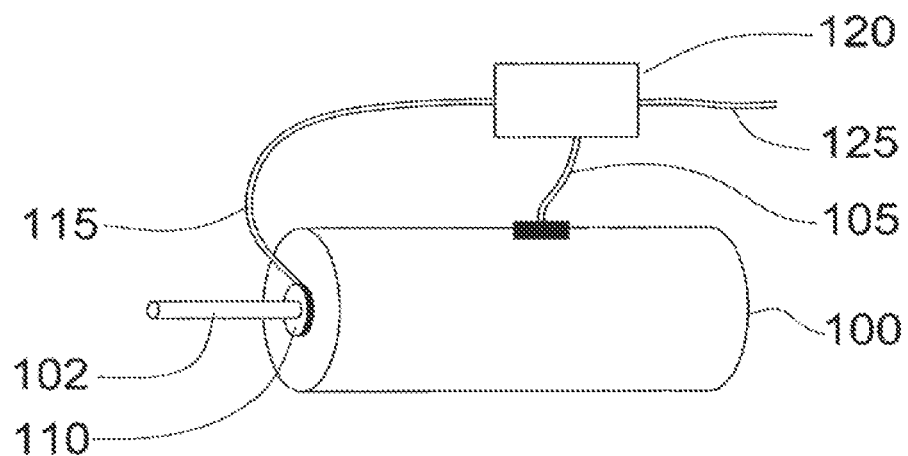
FIG. 1 illustrates a typical application of the invention

FIG. 1 illustrates a typical application of the invention, where a brushless DC motor 100 is driven/controlled by a motor controller 120 with the help of a fractional turn absolute position encoder 110 according to the invention. The position encoder 110 according to the invention can be seen as comprising a number of part-circle absolute rotational position encoders, coupled together in series to make a complete circle, a full turn. The number of part-circle absolute position encoders is equal to the number of poles of the DC-motor 100. The position encoder 110 is directly or indirectly coupled to the motor axle 102 of the motor 100. When the motor axle 102 turns, then the position encoder provides the motor controller 120 with a position signal 115 that represents the rotary position of the motor axle 102 between two poles. With the position signal 115, the motor controller 120 can convert the supplied power 125 into correct power signals 105 to feed to the motor. As mentioned previously it is very important for an electronic controller of a brushless DC motor to know the rotational position of the rotor between two poles to enable the motor to be driven as efficiently as possible.

Figure 2:
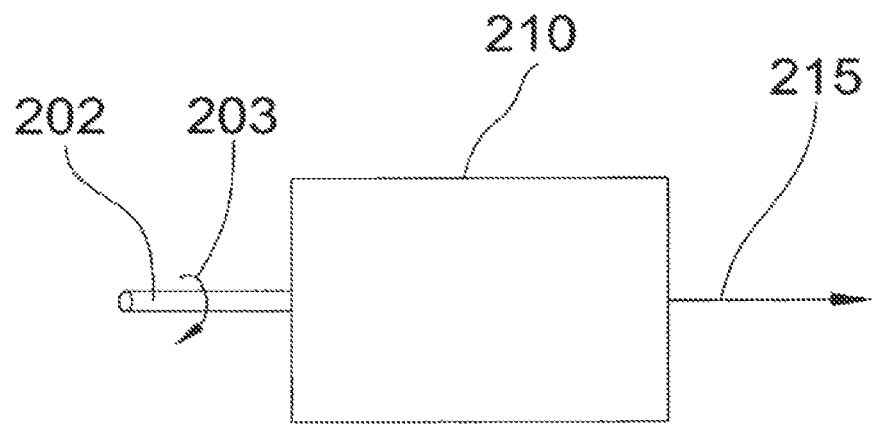
FIG. 2 illustrates a position encoder setup according to the invention

FIG. 2 illustrates a position encoder 210 setup. The position encoder 210 according to the invention will detect the rotational 203 position of a motor axle 202 in relation to the poles of the motor and transform/encode this physical position into an electrical position signal 215. This enables a motor controller to immediately know what relationship the poles have between rotor and stator even from power off, without having to rotate past a reference point. This is important to enable a smooth start up of the motor. The invention is from a practical point of view intended to be used in conjunction with brushless DC motors that are electronically controlled. A fractional absolute rotational position encoder according to the invention will provide a relevant position signal when turned-on even though for example a motor axle has been physically rotated when the encoder was turned-off. This in contrast with an incremental position encoder that will start from zero each time it is turned on until it has possibly rotated past a synchronization mark. Thus, an incremental position encoder will not detect at power-on that for example an axle has rotated during the encoder's turned-off period.

Figure 3:
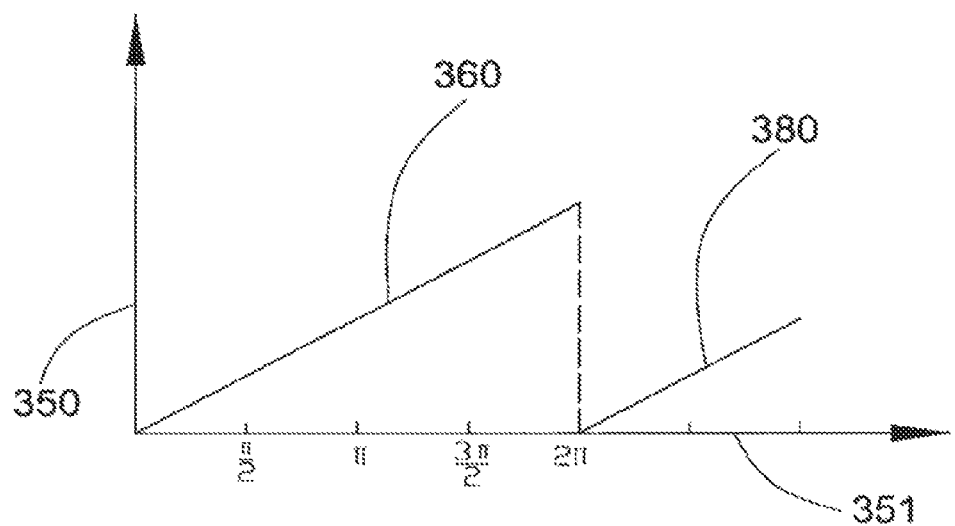
FIG. 3 illustrates a full turn absolute position encoder output

FIG. 3 illustrates a traditional full turn absolute position encoder output, where the y-axis 350 represents the output value of the encoder, the x-axis, 351 represents a rotational angle of the axle/encoder. The first line 360 shows the rotation encoder output in relation to rotational angle for a first turn. As can be seen, the output 360 gives unique values for every angle during the full turn. The second line 380 shows the rotation encoder output in relation to rotational angle during the beginning of a second turn, repeating the values given during the first turn.

Figure 4:
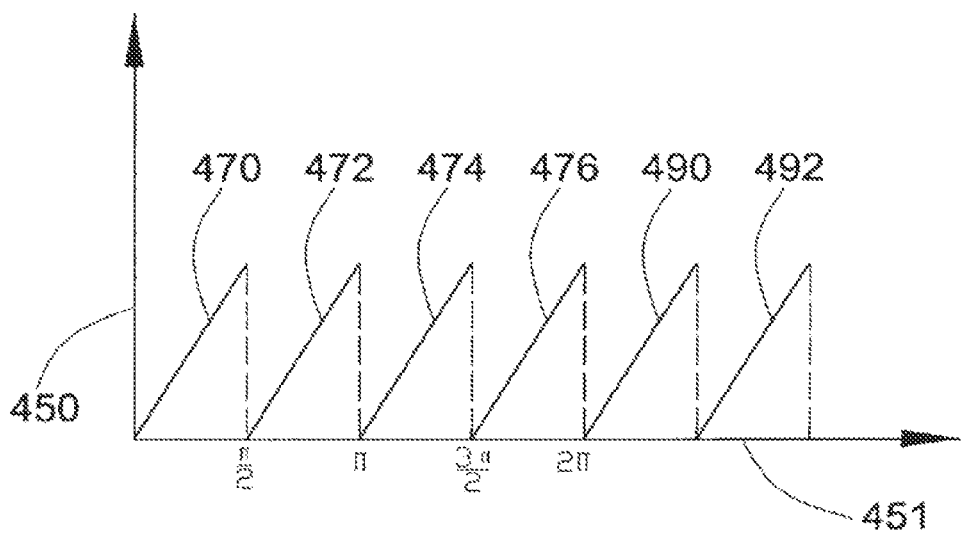
FIG. 4 illustrates a fractional turn absolute position encoder output according to the invention.

FIG. 4 illustrates a fractional turn absolute position encoder output according to the invention, where the y-axis 450 represents the output value of the encoder and the x-axis 451 represents the rotational angle of the axle/encoder. In the illustrated example, the fractional turn absolute position encoder is adapted to a four pole brushless DC motor which motor is electronically driven/controlled. This means that the encoder according to the invention will repeat its unique output four times per full turn, that is the encoder will give an absolute rotational position over an angle which is equal to a full turn divided by the number of poles. In this example this fractional full turn angle is π radians or 90 degrees. This can be seen in FIG. 4, where the first four outputs 470, 472, 474, 476 are during the first 2π radians, that is a full turn, and the last two outputs 490, 492 are given during the following turn.

Figure 5:
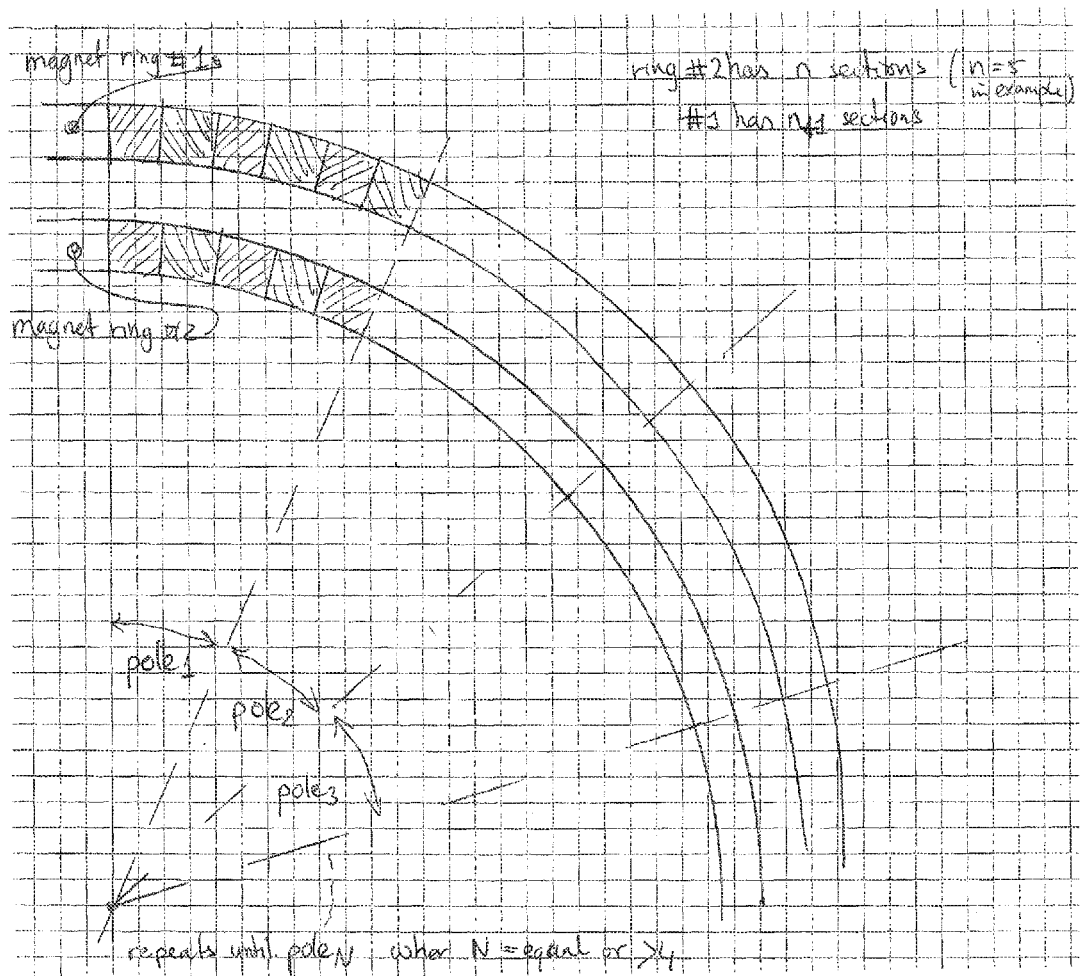
FIG. 5 illustrates a schematic of two multi-pole magnetic rings, each of the multi-pole magnetic rings being divided into N sections, and wherein a first one of the multi-pole magnetic rings comprises n magnetic pole-pairs for each of the N sections, and wherein a second one of the multi-pole magnetic rings comprises n+1 magnetic pole-pairs for each of the N sections, and wherein n is an integer.

FIG. 5 illustrates a schematic of two multi-pole magnetic rings, each of the multi-pole magnetic rings being divided into N sections. A first one of the multi-pole magnetic rings comprises n magnetic pole-pairs for each of the N sections. The second one of the multi-pole magnetic rings comprises n+1 magnetic pole-pairs for each of the N sections. N is preferably an integer.

The output thus repeats the same number of times as the DC motor has poles. The output 470, 472, 474, 476, 490, 492 only being unique for an angle which is equal to an angle between centers of two consecutive poles. The output is preferably synchronized/adjusted such that the output starts by the center of a pole and ends by a center of a consecutive pole.

The invention is not restricted to the above-described embodiments, but may be varied within the scope of the following claims.

FIG. 1—illustrates a typical application of the invention,
100 a brushless DC motor,
102 a motor axle,
105 motor power connections,
110 a position encoder according to the invention,
115 a position signal output from position encoder,
120 a motor controller,
125 a power input to the motor controller.

FIG. 2—illustrates a position encoder setup according to the invention,
202 a motor axle,
203 a motor axle direction of rotation,
210 a position encoder,
215 a position signal from the position encoder.

FIG. 3—illustrates a full turn absolute position encoder output,
350 y-axis, output value of encoder
351 x-axis, rotational angle of axle/encoder,
360 first turn rotation encoder output in relation to rotational angle,
380 second turn rotation encoder output in relation to rotational angle.

FIG. 4—illustrates a position encoder output for a four pole DC motor,
450 y-axis, output value of encoder,
451 x-axis, rotational angle of axle/encoder,
470 first part absolute encoder output during first turn in relation to rotational angle between two poles of a four pole DC motor,
472 second part absolute encoder output during first turn in relation to rotational angle between two poles of a four pole DC motor,
474 third part absolute encoder output during first turn in relation to rotational angle between two poles of a four pole DC motor,
476 fourth part absolute encoder output during first turn in relation to rotational angle between two poles of a four pole DC motor,
490 first part absolute encoder output during second turn in relation to rotational angle between two poles of a four pole DC motor,
492 second part absolute encoder output during second turn in relation to rotational angle between two poles of a four pole DC motor.

The invention claimed is:

1. A fractional absolute rotary position encoder, the fractional absolute rotary position encoder being arranged to be directly or indirectly mounted to a rotor of an N-pole electrical motor, where N is equal to or greater than four, the encoder comprising:
a sensing device, arranged to at least partly be mounted one of directly and indirectly to the rotor and to provide a measure corresponding to a rotation of the rotor wherein the measure is in the form of a continuous signal representing an absolute position of the rotor within a pole through which the rotor is moving;
a processing device, arranged to provide an absolute rotary position value from the continuous signal received by the sensing device such that the processing device can determine the position of the rotor continuously and at any location within the pole through which the rotor is moving; and wherein
the absolute rotary position value repeats N times for a full turn of the rotor thus providing an absolute rotary position encoding with unique values only over an angle that corresponds to an angle between two consecutive poles of the electrical motor.

2. The fractional absolute rotary position encoder according to claim 1, wherein the sensing device comprises N equal sections arranged to be mounted directly of indirectly to the rotor.

3. The fractional absolute rotary position encoder according to claim 1, wherein the sensing device comprises two multi-pole magnetic rings, each of the multi-pole magnetic rings being divided into N sections, and wherein
a first one of the multi-pole magnetic rings comprises n magnetic pole-pairs for each of the N sections, and wherein
a second one of the multi-pole magnetic rings comprises n+1 magnetic pole-pairs for each of the N sections, and wherein
n is an integer.

4. A method of providing a motor control unit of an N-pole motor where N is at least four, with a rotary position of an axle coupled to the motor, characterized in that the method comprises the steps of:
determining the number of poles, N, of the motor,
dividing a full turn of the axle by the number of poles, N, creating N fractions of the full turn of the axle,
coupling a fractional absolute rotary position encoding unit, having N times full scale absolute rotary position encoding through one full turn, on to the axle, and wherein
each full scale absolute rotary position encoding being equal to one fraction of the full turn of the axle, wherein at the end of each fraction the position of the rotor resets such that if looking at a plot of the rotor position the graph goes instantaneously from a maximum value to zero, and providing the motor control unit with values from the absolute rotary position encoding unit.

* * * * *